United States Patent [19]
Matt et al.

[11] Patent Number: 6,045,871
[45] Date of Patent: Apr. 4, 2000

[54] METHOD OF PRODUCING OPAQUE ADHERENT COATING ON THE SURFACE OF SUBSTANTIALLY HYDRATED CEMENTITIOUS SUBSTRATE

[75] Inventors: Richard Barry Matt, Quakertown, Pa.; Joseph Clark Reilly, Fullerton, Calif.

[73] Assignee: Rohm and Haas Company, Philadelphia, Pa.

[21] Appl. No.: 08/862,023

[22] Filed: May 22, 1997

Related U.S. Application Data

[60] Provisional application No. 60/019,298, Jun. 7, 1996.

[51] Int. Cl.⁷ .......................................... B05D 3/00
[52] U.S. Cl. ..................... 427/388.4; 427/393.4; 427/393.5; 427/393.6
[58] Field of Search .............................. 427/388.4, 393.4, 427/393.5, 393.6; 428/703

[56] References Cited

U.S. PATENT DOCUMENTS

| | | | |
|---|---|---|---|
| 4,427,836 | 1/1984 | Kowalski et al. | 525/301 |
| 4,594,363 | 6/1986 | Blankenship et al. | 521/64 |
| 4,999,218 | 3/1991 | Rehmer et al. | 427/54.1 |
| 5,681,385 | 10/1997 | Beckenhauer | 106/724 |
| 5,718,943 | 2/1998 | Hsu et al. | 427/136 |

OTHER PUBLICATIONS

Five page article entitled "Hardiplank Lap S, Smooth, Woodgrain & Cross–Cut" ( no author, no date).

*Primary Examiner*—Shrive Beck
*Assistant Examiner*—Paul D. Strain
*Attorney, Agent, or Firm*—Wendy A. Choi; Sudhir G. Deshmukh

[57] ABSTRACT

A method of producing an opaque adherent coating on the surface of a substantially hydrated cementitious substrate is provided. A waterborne storage stable sealer comprising an aqueous medium containing a binder polymer and an opacifying polymer is applied on the surface of such a cementitious substrate. Upon drying the layer substantially hides the primary efflorescence typically present on the surface of the cementitious substrate. Applicants have unexpectedly discovered that by optimally adjusting the thickness of the coating a weight amount of waterborne storage stable sealer solids in the waterborne storage stable sealer and a pigment volume content of the opacifying polymer in the storage stable sealer the opaque adherent coating is produced on the surface of the substantially hydrated cementitious substrate.

15 Claims, No Drawings

METHOD OF PRODUCING OPAQUE ADHERENT COATING ON THE SURFACE OF SUBSTANTIALLY HYDRATED CEMENTITIOUS SUBSTRATE

This application claims the benefit of priority under 35 USC 119(e) of provisional application Ser. No. 60/019,298 filed Jun. 7, 1996.

The present invention generally relates to a method of priming a cementitious substrate surface and more particularly to producing an opaque adherent coating on a cementitious substrate surface with a storage stable opaque sealer.

Cementitious substrate (CS) means a substrate, such as, a lap siding used on the exterior of building walls, a roof tile, floor tile, wall tile, wall panel, roof shingle, roof slate, patio floor, produced from a hydraulic substance. The term "hydraulic substance" means a substance having the ability on substantially complete hydration to form with water, relatively insoluble bonded and hardened aggregations of considerable strength and dimensional stability. The process of hydration takes place over a period of time, typically from several hours to several days, to substantially hydrate the CS. The hydraulic substances include Portland cement; aluminum cement; air-entraining cement; blended cement, such as, that typically blended with silica fibers, polymer fibers, or a mixture thereof; pozzolan cement; and trief cement, such as, that produced with wet slurry of finely ground slag. CS, is a concrete substrate typically produced by mixing the hydraulic substance, such as, Portland cement, and water with desired amounts of reinforcing materials for modifying the structural properties of the resulting substrate. The water/cement mixture may further include from 1 to 20 percent by weight based on the weight of cement of conventional binder polymers added either in the wet state or dry state. Some exemplary reinforcing materials added to the water/cement mixture include, wood chips or wood fibers, silica, mineral and glass fibers, expanded shale or other light weight aggregates, synthetic fibers, such as Nylon fibers, or glass and mineral wool, reinforcing materials, such as, gravel, sand, metal or polymer reinforcing structures.

One of the problems associated with CS is the formation of an efflorescent layer on the surface of CS, which is typically unevenly distributed on the surface to produce unsightly mottled appearance. The term "efflorescent layer" means a whitish coat formed on the CS surface during the hardening step of CS (known as primary efflorescence) or upon exposure of CS to weathering (known as secondary efflorescence). Such a whitish coating is found to be esthetically not pleasing. It is believed, without reliance thereon, that the phenomenon of efflorescence results from the migration of efflorescence forming materials, such as, calcium ions, from within CS to the CS surfaces during the hardening step or as a result of weathering of CS. As the water associated with cement constituents, such as, calcium ions, evaporates from the CS surface during the hardening step, the cement constituents tend to migrate and deposit, as salts, on the CS surface and thereby producing the primary efflorescent layer on the CS surface. Some of these salts also react with atmospheric carbon dioxide to form insoluble whitish salts, such as, for example, calcium carbonate, to form the secondary efflorescent layer. In case of a substantially hydrated CS, substantially no secondary efflorescence occurs. Thus, most of the efflorescence on a substantially hydrated CS is in the form of primary efflorescence. When a substantially hydrated CS having the primary efflorescent layer thereon is coated with a paint, the coating thereof tends to have unsightly mottled appearance, which aesthetically not very pleasing.

Attempts have been made to hide the mottled or blotchy appearance of the coating applied on a substantially hydrated CS by priming the surface of the substantially hydrated CS with a primer containing titanium dioxide or calcium carbonate pigment particles, before the topcoat of a conventional paint, such as, a latex paint, is applied thereon. However, to substantially hide the primary efflorescent layer, the conventional primer is loaded with significant amount of titanium dioxide or calcium carbonate pigments. Such high levels of pigmentation lessens the adhesion of the primer to the substantially hydrated CS surface. As a result, when a topcoat of paint is applied thereon, its adhesion to the substantially hydrated CS surface is also lessened. The method of the present invention and an opaque sealer used therein solve this problem by priming the substantially hydrated CS surface with the opaque sealer that not only substantially hides the mottled appearance of the topcoat resulting from the presence of primary efflorescent layer but it also provides for improved adhesion of the top coat to the substantially hydrated CS surface than the conventional pigment particle based primers.

Another problem associated with such conventional pigment particle based primers is that they are not storage stable and tend to settle out. As a result, unless the conventional primers containing the highly loaded pigment particles are constantly agitated they tend to settle out.

Thus, primer coatings having pigment particles therein result in coatings having unevenly distributed pigment particles in the primer and therefore the resulting primer coats therefrom do not have the desired hiding properties. It is conventional to add a dispersant to such highly pigmented to improve their dispersion. However, when attempted, such primers tend to produce coatings that are water sensitive and have lessened adhesion to the substantially hydrated CS surface.

The present invention is directed to a method of producing an opaque adherent coating on the surface of a substantially hydrated cementitious substrate, said method comprising:

applying a layer of a waterborne storage stable sealer comprising an aqueous medium containing a binder polymer and an opacifying polymer on said surface of said cementitious substrate; and drying said layer to substantially hide primary efflorescence on said surface of said cementitious substrate to produce said opaque adherent coating having a desired degree of opacity and adhesion to said cementitious substrate surface.

The present invention is further directed to a method of producing an opaque adherent coating on the surface of a substantially hydrated cementitious substrate, said method comprising:

applying a layer of a waterborne storage stable sealer comprising an aqueous medium containing a binder polymer and an opacifying polymer on said surface of said cementitious substrate; and drying said layer to substantially hide primary efflorescence on said surface of said cementitious substrate, wherein a weight amount of waterborne storage stable sealer solids in said waterborne storage stable sealer, a pigment volume content of said opacifying polymer in said storage stable sealer, thickness of said adherent opaque layer, and various permutations thereof are optimally adjusted to produce said opaque adherent coating having a desired degree of opacity and adhesion to said substantially hydrated cementitious substrate.

As used herein:

"Portland cement" means a fine gray powder typically made by heating, at 1350° C. to 1800° C., a calcareous material (limestone, marl or chalk) with an argillaceous material (clay or shale, $Al_2O_3 \cdot SiO_2$) to vitrification. The resulting clinker is then typically mixed and ground with gypsum, at about 2 percent by weight, to form Portland cement.

"Hydration" means formation of a compound by the combining of water with some other substance, such as, hydraulic cement. The process of hydration is time dependent and generally lasts for up to 28 days at which point, CS attains most of its structural strength. The time of hydration may be adjusted, if need be, by varying the humidity and by subjecting CS to elevated temperatures. By way of example, CS in the roof tile is substantially hydrated under high pressure steam within from 5 to 15 hours to up to 24 hours.

"Wet state" means the state of CS before hydration and before substantial evaporation of water has occurred from CS. This state for concrete roof tile, by way of example, may last for up to two hours following extrusion of the concrete roof tile. If desired the duration of wet state may be shortened or lengthened by heating or cooling, respectively or by maintaining CS in low or high humidity conditions, respectively.

"Slurry" means a fluid concrete mix having high water content, which by way of example, may vary from 20 to 50 percent water based on the weight of the cement. In addition to cement, the slurry may contain reinforcing materials, such as, those described earlier.

"Concrete substrate", means a substrate typically produced by mixing 1 part of Portland cement with 0 to 6 parts of sand, 0 to 4 parts of gravel, all by volume. Water is added to this cement mixture to achieve desired fluidity, such as, for example, 50 liters of water per 100 kilograms of cement is added to the cement mixture, which is then molded, compacted or formed into desired shape and then hardened by hydration to form CS, such as, a roof tile.

"Add-on" means grams of the solid portion of a latex binder (dry portion) coated over a meter square area of the surface of the substrate.

"GPC weight average molecular weight" means the weight average molecular weight determined by gel permeation chromatography (GPC) which is described on page 4, Chapter I of The Characterization of Polymers published by Rohm and Haas Company, Philadelphia, Pa. in 1976. For polymers that are soluble in either Tetrahydrofuran or dimethylformamide, polymethylmethacrylate is used as the molecular weight standard. For water soluble polymers, polymethacrylic acid is used as the standard. Prior to the GPC analysis of water soluble polymers, they are treated with potassium hydroxide in ethanol at elevated temperatures, which are sufficient to fully hydrolyze the water soluble polymers. The GPC weight average molecular weight can be estimated by calculating a theory weight average molecular weight. In systems containing chain transfer agents, the theory weight average molecular weight is simply the total weight of polymerizable monomer in grams divided by the total molar amount of chain transfer agent used during the polymerization. Estimating the molecular weight of a binder polymer system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate initiated systems, we have used a factor of approximately 0.5). Further information on theoretical molecular weight calculations can be found in Principles of Polymerization 2nd edition, by George Odian published by John Wiley and Sons, N.Y., N.Y. in 1981 and in Emulsion Polymerization edited by Irja Pirma published by Academic Press, N.Y., N.Y. in 1982.

"Glass transition temperature (Tg)" is a narrow range of temperature, as measured by conventional differential scanning calorimetry (DSC), during which amorphous polymers change from relatively hard brittle glasses to relatively soft viscous rubbers. To measure the Tg by this method, the copolymer samples were dried, preheated to 120° C., rapidly cooled to −100° C., and then heated to 150° C. at a rate of 20° C./minute while data was being collected. The Tg was measured at the midpoint of the inflection using the half-height method. Alternatively, the reciprocal of the glass transition temperature of a particular copolymer composition may typically be estimated with a high degree of accuracy by calculating the sum of the respective quotients obtained by dividing each of the weight fractions of the respective monomers, $M_1$, $M_2$, . . . $M_n$, from which the copolymer is derived by the $T_g$ value for the homopolymer derived from the respective monomer, according to an equation of the form:

$$1/T_{g(copolymer)} = \sum_{i=1}^{n} w_{(Mi)}/T_{g(Mi)} \quad (1)$$

wherein:

$T_{g(copolymer)}$ is the estimated glass transition temperature of the copolymer, expressed in degree Kelvin (° K);

$w_{(Mi)}$ is the weight fraction of repeat units in the copolymer derived from an $i^{th}$ monomer $M_i$; and $T_{g(Mi)}$ is the glass transition temperature, expressed in ° Kelvin (° K), of the homopolymer of an $i^{th}$ monomer $M_i$.

The glass transition temperature of various homopolymers may be found, for example, in "Polymer Handbook", edited by J. Brandrup and E. H. Immergut, Interscience Publishers.

"Dispersed polymer" means particles of polymer colloidally dispersed and stabilized in an aqueous medium.

"Solubilized polymer" includes "Water soluble polymer", "Water reducible polymer" or a mixture thereof. Water soluble polymer means a polymer dissolved in an aqueous medium. Water reducible polymer means a polymer dissolved in water and water miscible solvent. Solubilized polymer results in a polymer solution characterized by having the self-crowding constant (K) of the Mooney equation [$1/\ln_{\eta rel}=1/BC-K/2.5$] equal to zero. By contrast, dispersed polymer has (K) equal to 1.9. The details of Mooney equation are disclosed in an article entitled "Physical Characterization of Water Dispersed and Soluble Acrylic Polymers" by Brendley et al., in "Nonpolluting Coatings and Coating Processes" published by Plenum Press, 1973 and edited by Gordon and Prane.

"Opacifying polymer" means colloidally dispersed and stabilized polymer particles, which act opacifyinig agents in a dried state, wherein each particle therein contains at least one void.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. in 1987 edition of American Chemical Society Symposium series.

"Polymer or Pigment solids" means polymer or pigment in its dry state.

"Pigment volume content" means the volume percentage of pigment or opacifying polymer solids added to paint composition, volume percentage being based on the total volume of the paint composition.

The waterborne sealer composition suitable for use in the method of the present invention includes an aqueous evaporable medium containing an anionically stabilized binder polymer having a Tg in the range varying from −20° C. to 100° C., preferably from 0° C. to 60° C., and a GPC weight average molecular weight is in the range varying from 500 to 5,000,000, more preferably from 1,000 to 1,500,000, and most preferably ranging from 30,000 to 1,000,000.

The binder polymer of the composition suitable for the method may be a dispersed polymer, or it maybe a mixture of a water soluble polymer and a dispersed polymer, or a water-reducible polymer, or a mixture of the water soluble and water-reducible polymers, or a mixture of the dispersed, water-reducible and water soluble polymers, all in an aqueous evaporable medium.

The binder polymer of the composition suitable for the method may be a dispersed polymer having polymer particles dispersed in an aqueous evaporable medium or it may either be a water soluble polymer, a water-reducible polymer, a mixture of the water soluble and water-reducible polymers in the aqueous evaporable medium , or a mixture of the dispersed, water-reducible and water soluble polymers in the aqueous evaporable medium. If desired the binder polymer may include a mixture of a dispersed polymer with a water soluble or a water-reducible polymer. The binder polymer in the form of dispersed polymer particles is preferred, wherein the particle size of the dispersed polymer particles varies in the range of from 20 to 1000 nanometers, preferably in the range of from 50 to 500 nanometers, more preferably in the range of from 100 to 350 nanometers. The aqueous evaporable medium includes water or water having dissolved therein a water miscible organic solvent, such as, methanol, ethanol and glycol ethers. Water is preferred.

The binder polymer is polymerized from at least one or more of the following monomers, such as, for example, acrylic and methacrylic ester monomers including methyl (methyl)acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth) acrylate, oleyl (meth)acrylate, palmityl (meth)acrylate, stearyl (meth)acrylate, hydroxyethyl (meth)acrylate, and hydroxypropyl (meth)acrylate; acid functional monomers, such as, acrylic acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; sodium vinyl sulfonate; phosphoethyl(meth)acrylate; acrylamido propane sulfonate; diacetone acrylamide; glycidyl methacrylate; acetoacetoxyethyl methacrylate; acrolein and methacrolein; dicyclopentadienyl methacrylate; dimethyl meta-isopropenyl benzyl isocyanate; isocyanato ethylmethacrylate; styrene or substituted styrenes; butadiene; ethylene; vinyl acetate or other vinyl esters; vinyl monomers, such as, for example, vinyl halide, preferably vinyl chloride, vinylidene halide, preferably vinylidene The binder polymers polymerized from the following monomeric mixtures are more preferred:

1) butyl acrylate and methyl methacrylate,
2) butyl acrylate and styrene,
3) 2-ethyl hexyl acrylate with methyl methacrylate, or
4) 2-ethyl hexyl acrylate with styrene.

Preferably the monomeric mixture further includes an acrylic or methacrylic acid monomer or a mixture thereof.

The polymerization techniques used for preparing the anionically stabilized binder polymers of the present invention are well known in the art. The binder polymer may be prepared by aqueous solution polymerization or by emulsion polymerization. Emulsion polymerization is preferred. Either thermal or redox initiation processes may be used. Polymers and copolymers of alpha-beta ethylenically unsaturated monomers and their esters, especially the acrylic and methacrylic esters, are preferably prepared by processes given in "Emulsion Polymerization of Acrylic Monomers: May, 1966" published by the Rohm and Haas Company, Philadelphia, Pa.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05 percent to 3.0 percent by weight, all weight percentages based on the weight of total monomer. Redox systems using the same initiators coupled with a suitable reductant, such as, for example, sodium bisulfite, may be used at similar levels.

Chain transfer agents may be used in an amount effective to provide the desired GPC weight average molecular weight. For purposes of regulating molecular weight of the binder polymer being formed, suitable chain transfer agents include well known halo-organic compounds, such as, carbon tetrabromide and dibromodichloromethane; sulfur-containing compounds, such as, alkylthiols including ethaniethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include but are not limited to butyl mercaptopropionate; isooctyl mercaptopropionic acid; isooctylmercapto propionate; bromoform; bromotrichloromethane; carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, and dodecyl thioglycolate; thioesters; or combinations thereof. Mercaptans are preferred.

When the binder polymer in the form of a dispersed polymer is utilized, the polymer particle size may be controlled by the amount of conventional surfactants added during the emulsion polymerization process. Conventional surfactants include anionic, nonionic emulsifiers or their combination. Typical anionic emulsifiers include the salts of fatty rosin and naphtheniic acids, condensation products of napthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyoxyethylenated alkyl alcohols, amine factants are between 0.1 to 6 percent by weight based on total weight of total monomer.

Alternatively, the binder polymer may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases, the majority of the surface area of the particle will be occupied by at least one outer phase and the interior of the binder polymer particle will be occupied by at least one inner phase. The outer phase of the multi-stage polymer particles weighs 5 weight percent to 95 weight percent based on the total weight of the particle. It is often desirable for each stage of the multi-stage polymer particles to have a different Tg. If desired, each stage of these multi-stage polymer particles may be provided with different GPC weight average molecular weight, such as, the multi-stage polymer particle composition disclosed in U.S. Pat. No. 4,916,171.

The multi-stage polymer particles are prepared by conventional emulsion polymerization process in which at least two stages differing in composition are formed in a sequential fashion. Such a process usually results in the formation of at least two polymer compositions. Each of the stages of the multi-stage polymer particles may contain the same monomers, chain transfer agents, surfactants, as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

The binder polymer in the form of the water-reducible polymer or water-soluble polymer may be prepared directly in water if the monomer mix is water-soluble or, as is most often the case, the polymerization solvent is a water-miscible solvent, such as, isopropanol, butyl cellosolve, propylene glycol. In such a case, water may be included in the polymerization mixture or post added after the polymerization is complete. Such polymers may be prepared by utilizing the monomers described earlier. Another route to the preparation of a water-soluble polymer for this invention is to prepare a binder polymer having enough acrylic or methacrylic acid or other polymerizable acid monomer (usually greater than 10 percent) such that the binder polymer can be solubilized by the addition of ammonia or other base. Water-soluble polymers of this type are advantageously used as blends with the dispersed polymers.

The binder polymer may be provided with an acid functionality, which results from including in the range of from 0.5 percent to 20.0 percent, preferably in the range of from 0.8 percent to 10 percent, of acid monomers listed below in the monomer mixture, all percentages being in weight percent based on the total weight of binder polymer solids. Such an acid functionality results from including in the monomer mixture at least one monoethylenically unsaturated carboxylic acid, such as, acrylic acid, methacrylic acid, itaconic acid, crotonoic acid, aconitic acid, atropic acid, maleic acid, maleic anhydride, fumaric acid, vinyl benzoic acid, half-esters of ethylenically unsaturated dicarboxylic acids, half-amides of ethylenically unsaturated dicarboxylic acids and various mixtures thereof. Other suitable acid monomers include one or more monomethyl itaconate, monomethyl fumarate, monobutyl fumarate, acrylamido propane sulfonate, sodium vinyl sulfonate, 2 acrylamido-2-methylpropanesulfonic acid, 2-methacryloxyethyl phosphate and phosphoethyl(meth) acrylate. The monoethylenically unsaturated carboxylic acid is preferred and acrylic acid, methacrylic acid and mixtures thereof are more preferred.

The waterborne sealer suitable for use in the present invention further includes an opacifying polymer. The PVC of opacifying polymer solids in the waterborne sealer varies in the range of from 5 percent to 40, preferably in the range of from 10 to 35, more preferably in the range of from 20 to 30, all percentages being in volume percentages based on the total volume of the waterborne sealer. Such opacifying polymers are known in the art and are generally described in U.S. Pat. Nos., 4,427,836 and 4,594,363. The opacifying polymers suitable for use in the present invention are typically sequentially emulsion polymerized dispersed particles of heteropolymers in which a "core" of a polymeric acid is at least partially encased in a "sheath" that is permeable to a volatile base, such as, ammonia or an organic amine, adopted to cause swelling of the core by neutralization. The aqueous dispersion of the acid-containing core/sheath particles of the heteropolymers is useful in making water-based coating composition wherein it serves as an opacifying agent when a volatile base is used to at least partially (to a pH of 6) neutralize the heteropolymer, microvoids being formed in cores of the swollen particles when applied and dried as a coating. The amount of polymer deposited to form sheath polymer is generally such as to provide an overall particle size of the heteropolymer in the range of 0.07 to 4.5 microns, preferably in the range of from 0.1 to 3.5 microns, more preferably in the range of from 0.2 to 2.0 microns, in an unswollen condition (that is, before any neutralization to raise the pH to 6 and higher) whether the sheath polymer is formed in a single stage or in a plurality of stages. Thus, such heteropolymers serve as opacifying agents in the sealer used in the method of the present invention as a replacement for conventional pigment particles, such as, titanium dioxide or calcium carbonate. Some of the preferred commercially available opacifying polymers, include Ropaqu® OP-62 LO, OP-96, OP-3000 and HP-91 emulsions, all supplied by Rohm and Haas Company, Philadelphia, Pa.

If desired and depending on the intended use of the composition, additional components may be added to the waterborne sealer composition used in the method of the present invention. These additional components include but are not limited to thickeners; rheology modifiers; dyes; sequestering agents; biocides; dispersants; pigments, such as, titanium dioxide, organic pigments, carbon black; extenders, such as, calcium carbonate, talc, clays, silicas and silicates; fillers, such as, glass microspheres and quartz; anti-freeze agents; plasticizers; adhesion promoters; coalescents; wetting agents; waxes; surfactants; slip additives; crosslinking agents; defoamers; colorants; preservatives; freeze/thaw protectors, corrosion inhibitors; alkali or water soluble polymers. However, cement materials, such as, Portland cement or any other reinforcing materials used therein, that affect the storage stability of the waterborne sealer composition used in the method of the present invention are excluded.

The methods of producing hydrated cementitious substrate are known in the art. By way of example, Hatschck process provides for introducing a slurry of cement, sand or silica and if desired, reinforcing materials, such as, sand, wood chips or wood fibers, cellulose fibers, silica, mineral or glass fibers, expanded shale or other light weight aggregates, synthetic fibers, mineral wool, or various mixtures thereof, into molds having desired shapes in successive layers with intermediate steps for removing moisture in order to provide firmness or in one step. After substantially removing the moisture, these structures are sometimes known as preforms, which are then typically equilibrated for few hours, typically in the range of from 10 to 12 hours, to few days, typically in the range of from three to four days. Thereafter, the dried preforms are fully hydrated, typically under high heat of around 300° F. for several hours, typically 8 to 12 hours. Preferably, the hydration process takes place in an autoclave under high pressure steam at about 150 psi. After the hydration step, the cementitious substrates are cut and sized to desired sizes.

In accordance with the method of the present invention, a layer of the waterborne storage stable sealer is applied over a substantially hydrated cementitious substrate and then dried to substantially hide the primary efflorescence present on such substantially hydrated cementitious substrate.

The applicants have unexpectedly discovered that by adjusting one or more of the following variables, an opaque adherent coating having a desired degree of opacity and adhesion to said cementitious substrate surface is obtained:

1. The thickness of a layer of the waterborne storage stable sealer, typically in the range of from 0.1 to 1.5 mils, preferably in the range of from 0.2 to 1.0 mil, more preferably in the range of from 0.25 to 0.75 mil;
2. The pigment volume content (PVC) in the ranges described earlier; and
3. The weight amount of waterborne storage stable sealer solids in the range of from 10 percent to 40 percent weight, preferably in the range of from 15 to 35 percent, more preferably in the range of from 20 to 30 percent, all weight percentages being based on the total weight of said waterborne storage stable sealer.

If desired, the method of the present invention further includes adding additional clear or pigmented topcoats of conventional paint compositions, such as, latex or alkyd paints, on top of the sealer coating applied by the method of the present invention. For example, a layer of conventional latex paint typically used for producing high gloss, extended weatherability or additional protection from efflorescence, may be added on top of the sealer coating applied in accordance with the method of the present invention.

The method of the present invention produces a substantially hydrated cementitious substrate primed with the storage stable sealer suitable as a durable sealer coating on the surfaces, including the edges, of roof tiles, slates or eaves; building products, such as, interior and exterior sidings and concrete floor tiles. The coating of the present invention may be also be used to prevent water penetration of cementitious substrates, such as, roof tiles that are exposed to rainy weather conditions. If desired the composition may be provided with a pigment, such as, iron oxide, to produce sealer coating that does not require additional pigmented finish coats or stains on cementitious substrates.

TEST PROCEDURES

The following test procedures were used for generating the data reported in the Examples below:

Adhesion Test

The degree of the adhesion of an applied coating over a substrate was measured in accordance with a modified version of The ASTM standard D3359-90 Test method known as "Measuring Adhesion of Tape Test". To measure the adhesion by the Tape Test, a one inch "X" shaped cut is scribed with a razor blade in the coating applied over a test substrate. Then a one inch portion of a 2 inch long strip of a masking tape, known as Scotch Masking Tape, #250-32281 4, Core Series 4-1900, from 3M, Company, St. Paul, Minn. was applied over the scribed "X" shaped cut with the remainder one inch overhanging from the test surface. The surface over the tape was rubbed with an erasure to ensure good adhesion of the tape to the underlying substrate having a coating thereon. The tape was then pulled in one clean stroke by holding the overhanging end at 45° angle to the substrate surface. In the ASTM test, the tape is pulled straight down. The coated area beneath the tape was inspected to determine the amount of coating removed by the tape from the coated surface. Total removal of the coating was designated as a reading of 100. No removal of the coating was designated as a reading of 0. A reading of less than 25 was considered acceptable.

Hiding Test

The degree of opacity provided by an applied coating over a substrate was measured in two ways. By the visual inspection of the opacity provided by the applied coating over a test sample substrate and by simulating the degree of opacity provided by the coating on a test surface known as Leneta 5C opacity chart, under a modified version of The ASTM Test Method D 2805.88. Under the test, a 1.5 mil film of the untinted opacified sealer being tested was applied over a Leneta 5C opacity chart by means of a Bird Film Applicator, supplied by Paul N. Gardener, Pompano Beach, Fla. The coated chart was air dried for 30 minutes and then placed in an oven maintained at 120° C. for 5 minutes and then removed and air cooled. By using Gardner/Neotec Y-Reflectometer supplied by Paul N. Gardener, Pompano Beach, Fla., five Y-reflectance readings of the film from the coated area of the Leneta chart and five Y-reflectance readings from the black area of the chart were taken and the readings front each side were averaged to determine the contrast ratio (CR), which is based on the average Y-reflectance of the black side readings divided by the average Y-reflectance of the white readings (CR=average black side reading/average white reading). A CR equal to 1 means total reflectance and a CR equal to 0 means no reflectance. It is generally accepted that if two coatings have CRs that differ by 0.005 units, the difference in hiding can be also detected by eye.

EXAMPLES

The following ingredients measured in grams and shown in Table I below, were added to a jar in the order shown below and then moderately agitated for 10 minutes by using a laboratory stirrer to produce untinted opacified sealer Examples 1 to 4 at 30% solids.

TABLE 1

| Material | Ex. 1 | Ex. 2 | Comp. Ex. 3 | Comp. Ex. 4 |
|---|---|---|---|---|
| Polymer 1[1] | 100.00 | 100.00 | 100.00 | 100.00 |
| Opcifying Slurry[2] | — | — | 39.96 | 105.56 |
| Opcifying Polymer[3] | 9.58 | 39.96 | — | — |
| Water | 69.05 | 76.67 | 125.50 | 223.08 |
| Total | 178.63 | 216.63 | 265.46 | 429.64 |
| PVC | 10% | 20% | 20% | 40% |

Unless stated otherwise:
Ex. means Example.
Comp. Ex. means Comparative Example.
1 is Rhoplex ® AC-630 emulsion polymer at 50% solids supplied by Rohm and Haas Company, Philadelphia, Pennsylvania.
2 is an opacifying calcium carbonate slurry produced by adding and then grinding for 20 minutes on Cowles Dissolver, Model #W-12-1.5 supplied by Morehouse Industries, Fullerton, California, 245.5 g of water followed by Tamol ® 1124 dispersant supplied by Rohm and Haas Company, Philadelphia, Pennsylvania, and then by Omyacarb ® UF calcium carbonate powder supplied by Omya, Inc., Proctor, Vermont.
3 means Ropague ® OP-62 LO opacifying polymer at 37.5% solids supplied by Rohm and Haas Company, Philadelphia, Pennsylvania.

The following ingredients measured in grams and shown in Table 2 below, were added to a jar in the order shown below and then moderately agitated for 10 minutes by using a laboratory stirrer to produce tinted opacified sealer Examples 5 to 8 at 30% solids. The tint was provided by adding and then stirring for additional five minutes, iron oxide to the mixture.

TABLE 2

| Material | Ex. 5 | Ex. 6 | Comp. Ex. 7 | Comp. Ex. 8 |
|---|---|---|---|---|
| Polymer 1[1] | 100.00 | 100.00 | 100.00 | 100.00 |
| Opcifying Slurry[2] | — | — | 39.96 | 105.56 |
| Opcifying Polymer[3] | 9.58 | 39.96 | — | — |
| Water | 69.05 | 76.67 | 125.50 | 223.08 |
| Iron oxide[4] | 2.85 | 3.47 | 2.33 | 3.39 |
| Total | 181.48 | 220.10 | 267.79 | 433.03 |
| PVC | 10% | 20% | 20% | 40% |

Unless stated otherwise:
4 is a predispersed brown iron oxide #888-1572 supplied by Huls America, Inc., Somerset, New Jersey.

The sealer compositions of Examples 1 and 2 and Comparative Examples 3 and 4 were applied over half portions of 6 inches×7.5 inches test panels to produce coatings of 0.25 and 0.5 mil dry thicknesses, wherein the test panels were fashioned from Hardieplank™ cellulose fiber reinforced lap sidings supplied by James Hardie, Inc., Fontana, Calif., which had wood grain texture thereon. Sealed panels were dried under ambient conditions for 24 hours and then exposed to water bath for simulating weathering action typically experienced by the building planks used on the exterior walls of buildings and houses. The coated test panels were placed in a 60° C. Circulating Water Bath, Model 270 supplied by Precision Scientific Company, Chicago, Ill. The desired test conditions were obtained by filling the water bath with water maintained at 60° C. and then placing the test panels on top of water bath for 24 hours. They were then topcoated with Sherwin Williams Superpaint Latex Flat Paint identified as Super White 107-8062 and supplied by Sherwin Williams Company, Cleveland, Ohio, at the normal spread rate of 10 g./sq. ft and then dried under ambient conditions for 7 days before testing for adhesion. The topcoat was applied transversely over both the sealed and unsealed portions of the test panels. The results of the adhesion test are noted in Table 3 below:

TABLE 3

| Primer | Coating thickness (mils) | Tape Adhesion Percent coating removed from coated surface | Percent coating removed from coated surface |
|---|---|---|---|
| Example 1 (10 PVC) | 0.25 | 15 | 75 |
| Example 1 (10 PVC) | 0.50 | 5 | 95 |
| Example 2 (20 PVC) | 0.25 | 40 | 95 |
| Example 2 (20 PVC) | 0.50 | 25 | 95 |
| Comparative Example 3 (20 PVC) | 0.25 | 75 | 95 |
| Comparative Example 3 (20 PVC) | 0.50 | 20 | 75 |
| Comparative Example 4 (40 PVC) | 0.25 | 20 | 95 |
| Comparative Example 4 (40 PVC) | 0.50 | 10 | 95 |

From Table 3 it is seen that by reducing PVC and increasing the thickness of the primer coating, improved adhesion not only to the underlying substantially hydrated cementitious substrate but also to the topcoat of paint applied thereon is obtained by using the composition of the present invention as compared to the conventional primer sealers, which utilize a slurry of pigment particles, such as, calcium carbonate. Such conventional primer sealers require significantly higher PVC loading to reach similar adhesion strengths. Furthermore, Comparative Examples 3 and 4 started to settle out within two hours after stoppage of agitation (signs of syneresis-clear layer at the top of the jar). Comparative Examples 3 and 4 were placed in glass containers with a diameter of 1½ inches and filled to a height of 2½ inches. After 24 hours the calcium carbonate settled to a height of ¼ inch as measured from the bottom of the container. By contrast, Examples 1 and 2 of the present invention showed no signs of precipitating out even after a year. As, a result, it is more difficult to produce primer coatings having uniform properties with Comparative Examples 3 and 4 than Examples 1 and 2, since it is more difficult to maintain uniform dispersion of the slurry compared to the polymeric opacifying polymer utilized in the waterborne adherent sealer of the present invention.

Examples 1 and 2 and Comparative Examples 3 and 4 were tested for their ability to hide the primary efflorescence layer present on the test panel described earlier, the results of contrast ratios obtained under the aforedescribed modified ASTM D2805.88 method are shown in Table 4 below:

TABLE 4

| | Contrast Ratio | | | |
|---|---|---|---|---|
| | Example 1 (10 PVC) | Example 2 (20 PVC) | Comparative Example 3 (20 PVC) | Comparative Example 4 (40 PVC) |
| Contrast Ratio (CR) | 0.095 | 0.322 | 0.041 | 0.187 |

From Table 4, it is seen that CRs of Examples 1 and 2 are significantly higher than those of Comparative Examples 3 and 4 for the same PVC level. Thus, the applicants have unexpectedly discovered a method, which in comparison to conventional methods, produces opaque adherent coatings that are more effective opacifiers of primary efflorescence present on substantially hydrated cementitious substrates at less PVC levels, utilize waterborne storage stable sealer that are easy to use and handle, and provide improved adherence to substantially hydrated cementitious substrates, such as, the test panels described earlier and to topcoats applied thereon.

What is claimed is:

1. A method of producing an opaque adherent coating on a surface of a substantially hydrated cementitious substrate, said method consisting essentially of the steps of:

applying a layer of a waterborne storage stable sealer comprising an aqueous medium containing a binder polymer and an opacifying polymer on said surface of said cementitious substrate; and drying said layer to substantially hide primary efflorescence on said surface of said cementitious substrate to produce said opaque adherent coating having a desired degree of opacity and adhesion to said cementitious substrate surface.

2. The method of claim 1, wherein thickness of said adherent opaque layer is adjusted to produce said desired degree of opacity and adhesion to said substantially hydrated cementitious substrate.

3. The method of claim 2, wherein the thickness of said adherent opaque layer is adjusted to be in the range of from 0.1 mils to 1.5 mils.

4. The method of claim 1, wherein a pigment volume content of said opacifying polymer in said storage stable sealer is adjusted to produce said desired degree of opacity and adhesion to said substantially hydrated cementitious substrate.

5. The method of claim 4, wherein of said pigment volume content is adjusted to be in the range of from 5 percent to 40 percent of opaque polymer solids, all percentages being in volume percentages based on the total volume of said storage stable sealer.

6. The method of claim 1, wherein a weight amount of waterborne storage stable sealer solids in said waterborne storage stable sealer is adjusted to produce said desired degree of opacity and adhesion to said substantially hydrated cementitious substrate.

7. The method of claim 6, wherein said weight amount of waterborne storage stable sealer solids is adjusted to be in the range of from 10 percent to 40 percent weight, all weight percentages being based on the total weight of said waterborne storage stable sealer.

8. A method of producing an opaque adherent coating on a surface of a substantially hydrated cementitious substrate, said method consisting essentially of the steps of:

applying a layer of a waterborne storage stable sealer comprising an aqueous medium containing a binder polymer and an opacifying polymer on said surface of said cementitious substrate;

drying said layer to substantially hide primary efflorescence on said surface of said cementitious substrate; and applying a topcoat of a paint composition thereon to produce said opaque adherent coating having a desired degree of opacity and adhesion to said cementitious substrate surface.

9. A method of producing an opaque adherent coating on a surface of a substantially hydrated cementitious substrate, said method consisting essentially of the steps of:

applying a layer of a waterborne storage stable sealer comprising an aqueous medium containing a binder polymer and an opacifying polymer on said surface of said cementitious substrate; and drying said layer to substantially hide primary efflorescence on said surface of said cementitious substrate, wherein a weight amount of waterborne storage stable sealer solids in said waterborne storage stable sealer, thickness of said adherent opaque layer, and various permutations thereof are optimally adjusted to produce said opaque adherent coating having a desired degree of opacity and adhesion to said substantially hydrated cementitious substrate.

10. A method of producing an opaque adherent coating on a surface of a cementitious article, said method consisting essentially of the steps of:

forming said cementitious article;

applying a layer of a waterborne storage stable sealer comprising an aqueous medium containing a binder polymer and an opacifying polymer on said surface of said cementitious article; and drying said layer to substantially hide primary efflorescence on the surface of said cementitious article; and to produce said opaque adherent coating having a desired degree of opacity and adhesion to said cementitious article.

11. The method of claim 10, wherein said forming step comprises:

introducing a slurry into a mold of a desired shape to produce a preform therefrom, said slurry comprising water, cement and reinforcing material;

subjecting said preform to steam under high pressure in an autoclave to substantially hydrate said preform into said cementitious article.

12. The method of claim 11, wherein said reinforcing material is selected from the group consisting of sand, wood chips, wood fibers, silica, mineral fibers, glass fibers, expanded shale aggregates, other light weight aggregates, synthetic fibers, mineral wool and mixtures thereof.

13. The method of claim 10, further comprising applying a topcoat of a paint composition on said opaque adherent coating.

14. A cementitious article in the form of a lap siding, roof tile, floor tile, wall tile, wall panel, roof shingle, roof slate, or a patio floor produced in accordance with the method of claim 10.

15. The method of claim 1, 8, 9 or 10, wherein said opacifying polymer comprises dispersion of polymer particles in an aqueous medium, said polymer particles comprising sequentially polymerized heteropolymer having a base swelled core.

* * * * *